United States Patent
Sasso et al.

(10) Patent No.: US 8,830,871 B2
(45) Date of Patent: Sep. 9, 2014

(54) PERSISTENT PRINCIPAL SWITCH FOR FIBRE CHANNEL FABRIC

(75) Inventors: Christian Sasso, Milpitas, CA (US); Siddharth Kasat, San Jose, CA (US); Ankur Goyal, San Jose, CA (US); Amitkumar Patel, Fremont, CA (US); Kishan Kumar Kotari Uppunda, Bangalore (IN)

(73) Assignee: Cisco Technology, Inc., San Jose, CA (US)

( * ) Notice: Subject to any disclaimer, the term of this patent is extended or adjusted under 35 U.S.C. 154(b) by 226 days.

(21) Appl. No.: 13/396,831

(22) Filed: Feb. 15, 2012

(65) Prior Publication Data
US 2013/0208625 A1    Aug. 15, 2013

(51) Int. Cl.
*H04L 12/28* (2006.01)
(52) U.S. Cl.
USPC .......................... 370/255; 370/254; 709/243
(58) Field of Classification Search
USPC .............. 370/254, 255, 360, 389, 395, 395.1, 370/395.7, 396, 401, 422, 471, 477, 462; 709/223, 224, 243
See application file for complete search history.

(56) References Cited

U.S. PATENT DOCUMENTS

| | | | |
|---|---|---|---|
| 7,873,984 B2 * | 1/2011 | Hammons et al. | 726/1 |
| 7,876,707 B2 | 1/2011 | Sasso et al. | |
| 2006/0023707 A1 * | 2/2006 | Makishima et al. | 370/389 |
| 2007/0201457 A1 * | 8/2007 | Betker et al. | 370/360 |
| 2008/0046710 A1 * | 2/2008 | Maddocks et al. | 713/2 |
| 2009/0067430 A1 * | 3/2009 | Sasso et al. | 370/394 |
| 2011/0216778 A1 * | 9/2011 | Chung et al. | 370/401 |

OTHER PUBLICATIONS

Thomas, Tim, "SAN Fundamentals: How Fibre Channel SANs are Built, Secured and Managed," Sun Microsystems, May 18, 2006.

* cited by examiner

*Primary Examiner* — Hassan Phillips
*Assistant Examiner* — Ajay Cattungal
(74) *Attorney, Agent, or Firm* — Edell, Shapiro & Finnan, LLC

(57) ABSTRACT

According to one aspect, a Fiber Channel (FC) switch that is currently serving as a Principal Switch among a plurality of FC switches in a FC Fabric sends an Exchange Fabric Parameters (EFP) frame having an empty domain identifier list to neighboring FC switches during a first portion a Principal Switch Selection phase. During a second portion of the Principal Switch Selection phase that is after the first portion, the first Fiber Channel switch sends to neighboring FC switches an EFP frame having a non-empty domain identifier list to indicate to the neighboring FC switches that the first FC switch is to remain serving as the Principal Switch in the FC Fabric.

21 Claims, 7 Drawing Sheets

PERSISTENT PRINCIPAL SWITCH FOR FIBRE CHANNEL FABRIC

TECHNICAL FIELD

The present disclosure relates to Fibre Channel networks.

BACKGROUND

In Fibre Channel networks there are a plurality of switches that are used to switch Fibre Channel traffic between various destinations, e.g., servers and storage devices. In a given Fibre Channel network or Fabric, one switch among the plurality of switches is selected to serve as the so-called Principal Switch. The Principal Switch is mainly responsible for assigning unique domain identifiers to all the switches in a Fabric.

The decision about which switch in a Fabric is to serve as the Principal Switch can be forced by a network administrator, or the switches can be left to decide for themselves using built-in logic, during what is called a Principal Switch Selection phase. The switch that is serving as the Principal Switch also is responsible for assigning unique domains to itself and the other switches in the Fabric during the Domain Identifier (ID) Distribution phase.

DESCRIPTION OF EXAMPLE EMBODIMENTS

Overview

According to one aspect, a Fibre Channel (FC) switch that is currently serving as a Principal Switch among a plurality of FC switches in a FC Fabric sends an Exchange Fabric Parameters (EFP) frame having an empty domain identifier list to neighboring FC switches during a first portion of a Principal Switch Selection phase. During a second portion of the Principal Switch Selection phase that is after the first portion, the first Fibre Channel Switch sends to neighboring FC switches an EFP frame having a non-empty domain identifier list to indicate to the neighboring FC switches that the first FC switch is to remain serving as the Principal Switch in the FC Fabric.

In accordance with another aspect, an FC switch that is currently not serving as a Principal Switch among a plurality of FC switches in a FC Fabric receives an input command to restart the FC Fabric. The FC switch sends to neighboring FC switches, during a first portion of a Principal Switch Selection phase, an EFP frame having a non-empty domain identifier list to indicate that the FC switch is to immediately serve as the Principal Switch in the FC Fabric and supersede another FC switch that is currently serving as the Principal Switch. The EFP frame sent during the first portion occurs before a second portion of the Principal Switch Selection when the FC switch that is currently serving as the Principal Switch is to send an EFP frame with a non-empty domain identifier list.

In accordance with still another aspect, a first FC switch in a first FC Fabric that is to be merged with a second FC Fabric sends to a second FC switch in the second FC Fabric an EFP frame that includes information about an FC switch that is currently serving as a Principal Switch in the first FC fabric. The first FC switch receives from the second FC switch an EFP frame that includes information about a FC switch that is currently serving as a Principal Switch in the second FC Fabric. The first FC switch determines which of the FC switches that are serving as the Principal Switches in the first and second FC Fabrics, respectively, has a higher priority, and is to serve as the Principal Switch for a merged FC Fabric of the first and second FC Fabrics. Upon initiation of a Principal Switch Selection phase for the merged FC Fabric, the first FC switch sends to neighboring FC switches an EFP frame with a non-empty domain identifier list and including information indicating the FC switch that is to serve as the Principal Switch for the merged FC Fabric. Similar functions are performed by the second FC switch in the second FC Fabric.

EXAMPLE EMBODIMENTS

Figure 1:
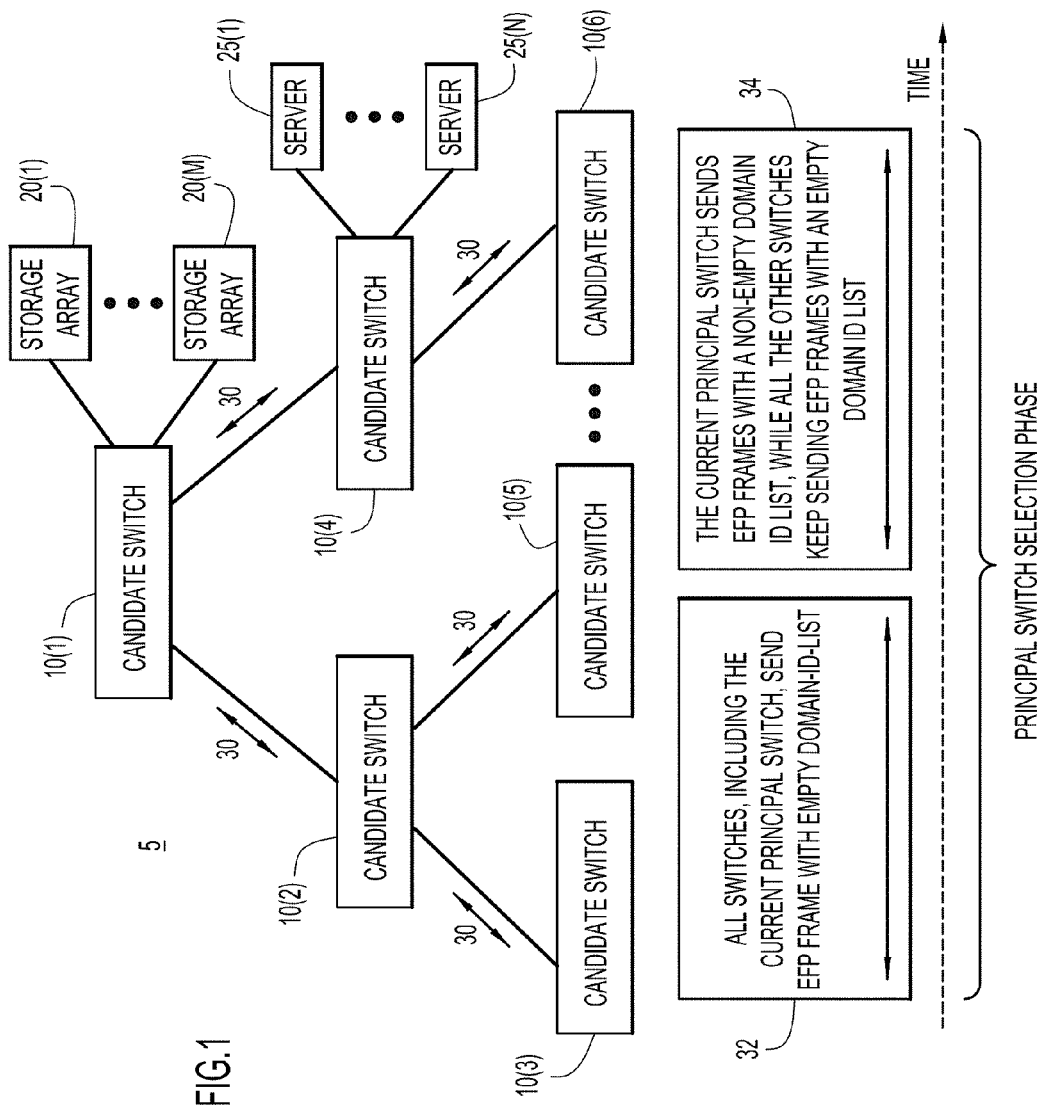
FIG. 1 is a block diagram showing an example of a Fibre Channel network in which a Fibre Channel switch can become a Principal Switch in a persistent manner that is independent of runtime and configured priorities of the switches.

Referring first to FIG. 1, an example of a Fibre Channel (FC) network is generally shown at reference numeral 5. In this example, FC network 5 is a virtual storage area network (VSAN) and comprises a plurality of FC switches 10(1)-10(K), storage arrays 20(1)-20(M), and host servers 25(1)-25(N). While FIG. 1 shows the storage arrays 20(1)-20(M) hanging off of switch 10(1) and the host servers 25(1)-25(N) hanging off switch 10(4), this is only a simplified example and not meant to be limiting. In an actual deployment, there may be zero or more storage arrays hanging off of each switch and zero or more host servers hanging off of each switch. Moreover, FIG. 1 shows each switch 10(1)-10(K) labeled as a "candidate" switch, and the reason for the use of this term will become more apparent hereinafter.

The operations of a FC Fabric are governed by an applicable standard, e.g., the Fibre Channel Switch Fabric-2 (FC-SW-2) standard. When a FC network is initially deployed, a Build Fabric phase occurs followed by a Principal Switch Selection phase. A Domain Identifier is dynamically assigned to an FC switch when it comes online. The Principal Switch Selection phase begins, which is similar to a root bridge election in Spanning Tree systems, followed by a Domain Identifier Distribution process.

Before an FC switch can communicate with other switches, it first determines the addresses of attached N_Ports. From the domain IDs assigned by the Principal Switch, a switch assigns to each attached node a Fibre Channel ID (FCID).

For purposes of the descriptions herein, the following are defined:

An Exchange Fabric Parameters (EFP) frame with an empty Domain ID list is abbreviated as "EFP frame without (w/o) dom-id-list". An "EFP frame with a non-empty Domain ID list" is abbreviated as "EFP frame with (w/) dom-id-list". A switch can make a domain id list non-empty by simply including its own domains in the list.

As explained herein, in a given domain of an FC network or Fabric, one switch among the plurality of switches is selected to serve as the Principal Switch. The Principal Switch is responsible for assigning unique Domain IDs to all switches in the Fabric.

During the Principal Switch Selection phase, all of the switches (called candidate switches at this point) send to their neighbor switches EFP frames with an empty domain id list. At the start of the Principal Switch Selection phase, the EFP frame sent by each candidate switch also contains a priority designation and World Wide Name (WWN) for the respective switch. In so doing, each switch "candidates" itself to be the new Principal Switch by specifying its own WWN and priority in a header of the EFP frame that it sends during an initial portion of the Principal Switch Selection phase. The EFP frames sent during the Principal Switch Selection phase are shown at reference numeral 30 in FIG. 1.

Eventually, the switch that showed the numerically lowest priority to the other switches becomes the Principal Switch. The Principal Switch is automatically assigned runtime priority 2 (unless its configured priority is 1, in which case its runtime priority is also set to 1) while all the subordinate switches assume a runtime priority equal to their configured priority (unless a subordinate's switch configured priority is 1 or 2, in which case its runtime priority is set to 3). For example, a default configured priority for FC switches is 128. The "priority" is the "runtime priority", while the configured priority is not indicated, because it is implicitly assumed to be 128 in this example. For example, if the byte values of the WWN for candidate switch 10(1) are the lowest values among the WWNs of all the candidate switches, then candidate switch 10(1) would have the numerically lowest priority to the other switches and becomes the Principal Switch. The Principal Switch is responsible for assigning unique domains to itself, and to the other switches in the Fabric during the Domain ID Distribution phase that occurs after the Principal Switch Selection phase.

Typically, all switches in a Fabric, including the current Principal Switch, have a configured priority of a predetermined value, e.g., 128. Therefore, oftentimes the Principal Switch ends up being the FC switch with the "better" (lower byte value) WWN. This means that if a network administrator for an FC network configures priority 2 on a subordinate switch, and restarts the Fabric, the Principal Switch will not change, because if the priority is the same as another switch, the WWN is used to determine overall priority of the switch with respect to other switches.

For example, candidate switch 10(1) is the current Principal Switch (its runtime priority is 2, and its configured priority is 128) and another switch, e.g., switch 10(K), has a runtime priority of 128 and a configured priority of 2. Thus, the EFP frames sent by these switches will have equal priority indicated in their headers. When two EFP frames carry the same priority, the "tie" is resolved by comparing the WWNs in the EFP frames. The lowest byte value WWN is considered "better" and will prevail as the winner, and the source FC switch of the EFP frame with the lower WWN byte value will be selected as the Principal Switch. In this example, switch 10(1) will continue to be the Principal Switch (assuming that its WWN has a lower byte value than that of switch 10(K)).

To make another switch the Principal Switch, its configured priority can be set to be priority 1, so that it is even lower than the runtime priority 2 of the current Principal Switch, and then the Fabric can be re-started. For example, if the current Principal Switch is switch 10(1), switch 10(2) can be made the future Principal Switch (after a Fabric restart) by making the configured priority of switch 10(2) to be priority 1.

However, a scenario may arise in which a network administrator may want to make a third switch the Principal Switch. In general, the technique of lowering the priority will no longer work because there is no way to configure the priority of a switch to be lower than priority 1. To solve this problem, the priority of the current Principal Switch needs to be raised to priority 2 and the Fabric re-started, then the priority of the switch that is to be the new Principal Switch has to be lowered (for instance to priority 2), and the Fabric re-started again. Unfortunately, this 4-step process is rather complicated and beyond the capabilities of many network administrators.

Accordingly, techniques are disclosed herein to make the Principal Switch Selection phase independent of both the configured priority and the runtime priority. The FC-SW-2 standard provides that during a Principal Switch Selection an EFP frame with a non-empty domain id list is always considered as having a better priority than any EFP frame with an empty domain id list, regardless of the value of the priority advertised in the headers of the EFP frames. Since the FC-SW-2 standard recommends that switches performing the Principal Switch Selection protocol send EFP frames with an empty domain id list, by having instead the switch that is currently the Principal Switch send EFP frames with a non-empty domain id list for a last portion of a Principal Switch Selection phase (e.g., the last 6 seconds), it is guaranteed that, after the first portion (e.g., the first 4 seconds), the current Principal Switch will confirm itself to be the future (and thus remain the) Principal Switch regardless of the values of the priority advertised in the headers of the EFP frames.

As shown in FIG. 1, according to the techniques presented herein, the Principal Switch Selection phase is divided into first and second portions. During the first portion, shown at reference numeral 32, all switches, including the current Principal Switch, send EFP frames with an empty domain id list. During the second portion, shown at reference numeral 34, the current Principal Switch sends EFP frames with a non-empty domain id list, while all other switches continue sending EFP frames with an empty domain id list. As a result, the current Principal Switch will continue to be the Principal Switch regardless of the configured and runtime priority of any other switch. Accordingly, the designation of a switch as a Principal Switch is persistent.

Figure 2:
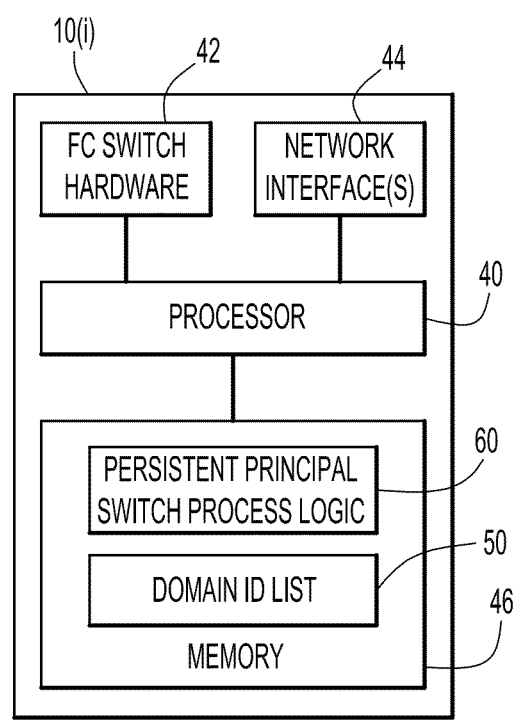
FIG. 2 is a block diagram showing an example of a Fibre Channel switch that can become a Principal Switch in a persistent manner.

Reference is now made to FIG. 2. FIG. 2 shows an example of a block diagram of a FC switch, generically identified by reference numeral 10(i), which is capable of performing the persistent Principal Switch selection techniques. The switch comprises a processor 40, FC switch hardware 42, network interface(s) 44 and memory 46. Memory 46 includes a domain ID list 50 and persistent Principal Switch process logic 60. The domain ID list 50 contains a list of domain IDs for runtime domains that may be serviced by the switch.

FC switch hardware 42 comprises digital logic and other circuitry configured to perform the FC switching operations in an FC network. The FC switch hardware 42 may be implemented by one or more application specific integrated circuits (ASICs) or central processing units (CPUs). The network interface(s) 44 include suitable FC interfaces, such as ports, for connection to an FC network and also to any other network for control/command functions associated with switch 10(i).

Memory 46 may comprise read only memory (ROM), random access memory (RAM), magnetic disk storage media devices, optical storage media devices, flash memory devices, electrical, optical, or other physical/tangible (e.g., non-transitory) memory storage devices. Processor 30 is, for example, a microprocessor or microcontroller, which executes instructions for the persistent Principal Switch process logic 60. Thus, in general, the memory 46 may comprise one or more computer readable storage media (e.g., a memory device) encoded with software comprising computer executable instructions and when the software is executed (by processor 30) it is operable to perform the operations described herein in connection with persistent Principal Switch process logic 60. Further details of such operations are provided below with reference to FIGS. 3-7.

Figure 3:
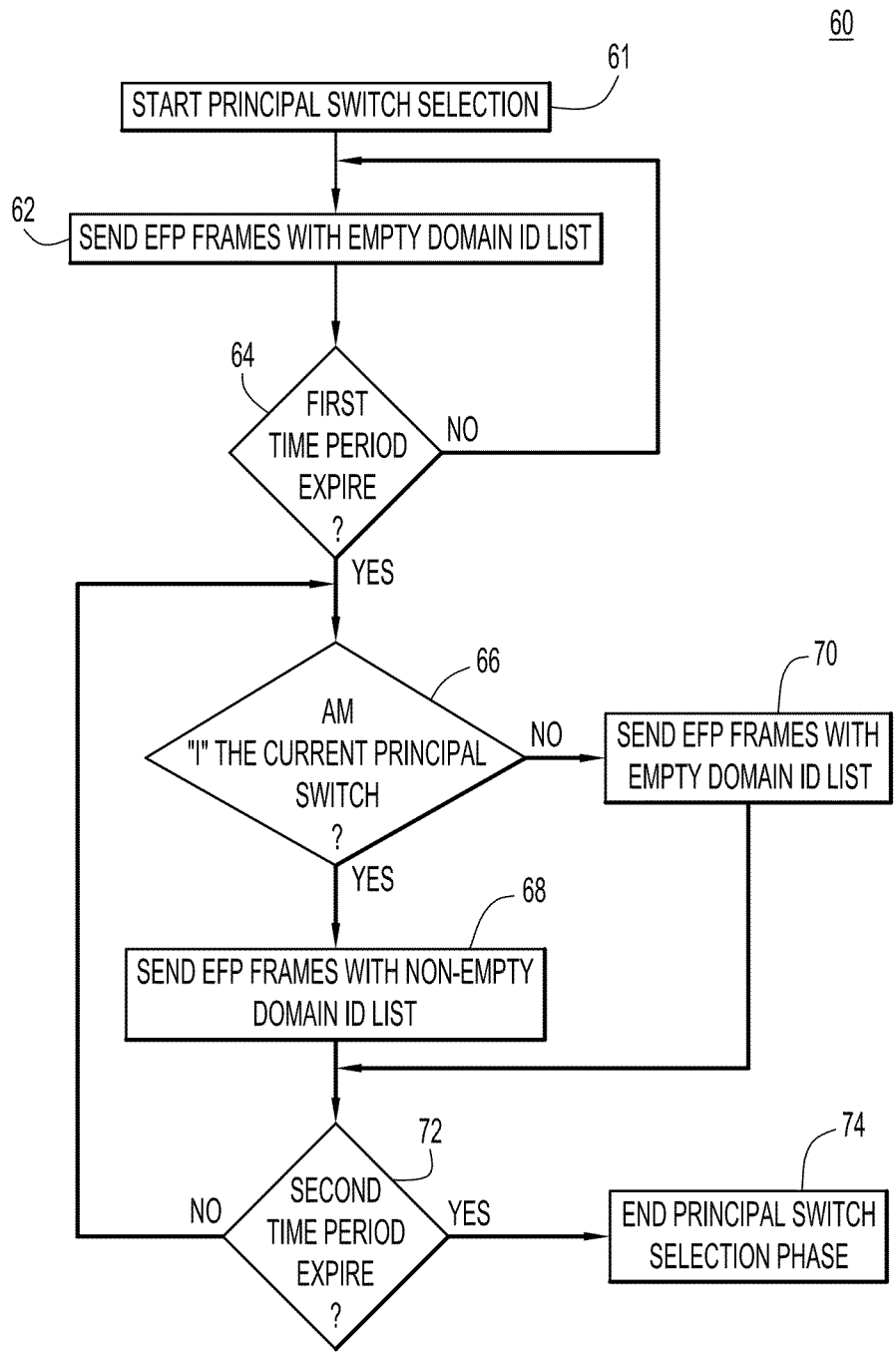
FIG. 3 is a flow chart showing an example of operations performed in a Fibre Channel switch to enable the persistent Principal Switch techniques depicted by FIG. 1.

FIG. 3 illustrates a flow chart that depicts the operations associated with execution of the persistent Principal Switch process logic 60 in a FC switch. At 61, the Principal Switch Selection phase is started, according to activities prescribed by the FC standard. At 62, the switch sends EFP frames with an empty domain id list to its neighbor FC switches. At 64, the switch determines whether a first time period has expired corresponding to the first portion of time 32 shown in FIG. 1, e.g., four seconds. The switch continues sending the EFP frames with an empty domain id list during this first period of time. When at 64 it is determined that the first period of time has expired, then at 66, the switch determines whether it is the current Principal Switch. A switch is the current Principal Switch based on a previous Principal Switch Selection phase during which it was selected to be the Principal Switch according to the FC standard as described herein.

If at 66, a switch determines that it is the current Principal Switch, then at 68, the switch sends EFP frames with a non-empty domain id list to its neighbor switches. On the other hand, if at 66, a switch determines that it is not the current Principal Switch, then at 70, the switch continues to send EFP frames with an empty domain id list. At 72, the switch determines whether a second time period (corresponding to the second portion of time 34 shown in FIG. 1) has expired. Until the second period of time has expired, operations 66, 68 and 70 are continued to be performed. Thus, if the switch is the current Principal Switch, it will send EFP frames with a non-empty domain id list for the second period of time after the first period time and if the switch is not the current Principal Switch, it will continue to send EFP frames with an empty domain id list for the second period of time after the first period time. When the second period of time has expired, then at 74, the Principal Switch Selection phase ends.

Thus, the flow of FIG. 3 can be summarized as follows. At an arbitrary first FC switch that is currently serving as a Principal Switch among a plurality of FC switches in a FC Fabric, an EFP frame having an empty domain identifier list is sent to neighboring FC switches during a first portion a Principal Switch Selection phase. During a second portion of the Principal Switch Selection phase that is after the first portion, the first FC switch sends to neighboring FC switches an EFP frame having a non-empty domain identifier list to indicate to the neighboring FC switches that the first FC switch is to remain serving as the Principal Switch in the FC Fabric.

From the perspective of an FC switch that is on the receiving end of EFP frames, the following summarizes the operations performed. At an FC switch among a plurality of FC switches in a FC Fabric, an EFP frame having an empty domain identifier list is received from one or more neighboring FC switches during a first portion of a Principal Switch Selection phase. During a second portion of the Principal Switch Selection phase that is after the first portion, an EFP frame having a non-empty domain identifier list is received from an arbitrary first FC switch (that is currently serving as the Principal Switch for the FC Fabric). An indication is stored in the FC switch that the first FC switch is to serve as a Principal Switch in the FC Fabric. Furthermore, during the first portion of the Principal Switch Selection phase, the FC switch will receive from all FC switches in the FC Fabric an EFP frame having an empty domain identifier list. As explained hereinafter in connection with the techniques of FIGS. 4 and 5, if, during the first portion of the Principal Switch Selection phase, the FC switch receives from a second FC switch an EFP frame having a non-empty domain identifier list, then the FC switch stores information to indicate that the second FC switch is to immediately serve as the Principal Switch in the FC Fabric and supersede the first FC switch as the Principal Switch.

Further enhancements to the persistent switch selection techniques are now described. Conventionally, a Command Line Interface (CLI) command to restart a virtual storage area network (VSAN) is: fcdomain restart [disruptive] vsan x. A principal option is added to create a new CLI input command: fcdomain restart [disruptive|principal] vsan x. These are just examples of CLI commands for one vendor's FC equipment. The syntax of commands may vary depending on the manufacturer of the FC equipment.

The disruptive and principal options are mutually exclusive. This is because a disruptive reconfiguration is supposed to reset a Fabric without carrying over any information from previous phases. In particular, it is acceptable if the Principal Switch changes after a restart of the Fabric.

Figure 4:
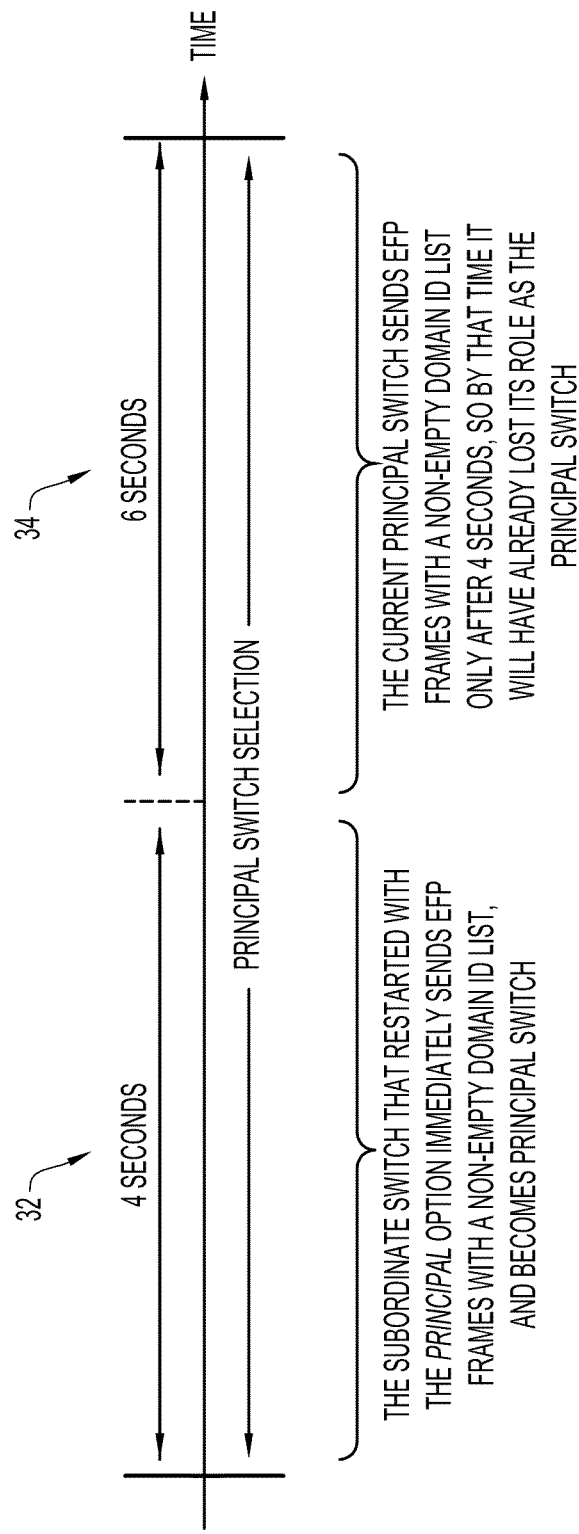
FIG. 4 is a diagram showing another technique by which any switch can restart a storage area network and become the Principal Switch.

Reference is now made to FIG. 4 that addresses a scenario when a VSAN is restarted. When a network administrator restarts a VSAN without using the principal option, a normal Principal Switch Selection occurs, with the only exception, as explained above, that the current Principal Switch will send EFP frames with a non-empty domain id list after a first period of time, e.g., approximately four seconds into the phase. However, according to the persistent Principal Switch selection techniques described herein, when a user restarts a VSAN using the principal option from a subordinate switch which is to become the new Principal Switch after restart of the VSAN, the subordinate switch will immediately start sending EFP frames with a non-empty domain id list during the first portion 32 of the Principal Switch Selection phase, guaranteeing that it will become the new Principal Switch. During the second portion 34, the current Principal Switch will send EFP frames with a non-empty domain id but because the subordinate switch has already started sending EFP frames with a non-empty domain id list, the current Principal Switch will have already lost its role as Principal Switch to the subordinate switch.

Figure 5:
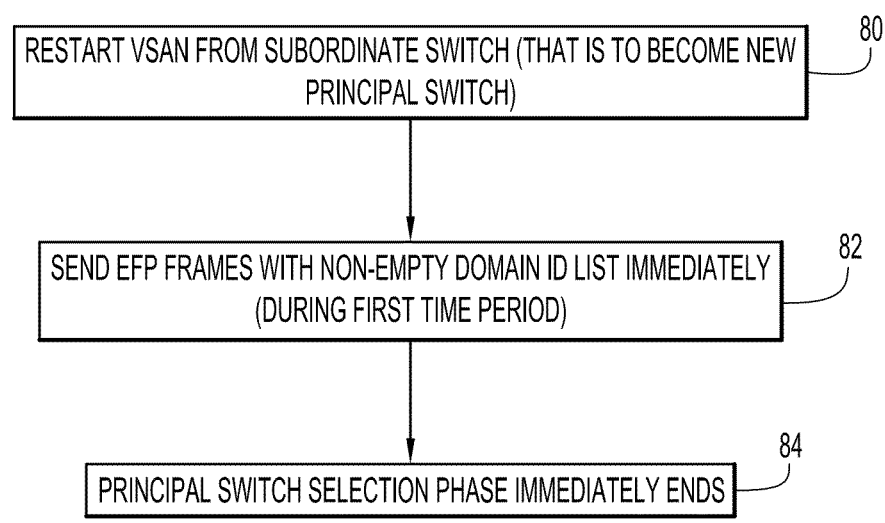
FIG. 5 is a flow chart depicting the operations in a switch to restart a storage area network and become the Principal Switch.

Reference is now made to FIG. 5. FIG. 5 illustrates a flow chart for operations performed by a switch for the scenario depicted in FIG. 4. At 80, a subordinate switch restarts the VSAN with the principal option so that it becomes the new Principal Switch. For example, a network administrator restarts the subordinate switch using a CLI command with the principal option described above. At 82, rather than waiting until the second portion of the Principal Switch Selection phase (as depicted in FIG. 1), the subordinate switch seeking to become the new Principal Switch sends EFP frames with a non-empty domain id list immediately (during the first portion of the Principal Switch phase). As explained above in connection with FIG. 4, the result of immediately sending EFP frames with a non-empty domain id list is that the subordinate switch will become the new Principal Switch (overriding the current Principal Switch) upon completion of the VSAN restart. At 84, the Principal Switch Selection Phase immediately ends.

Using the techniques depicted in FIGS. 4 and 5, it is possible to move from a persistent Principal Switch to another switch using much simpler semantics than that required by the FC-SW-2 standard. A network administrator types the "restart principal" CLI command from the switch it wishes to make as the new Principal Switch, and the Principal Switch Selection protocol takes care of everything else. In particular, network administrators need not tinker with priority values of switches across the Fabric. Moreover, theses techniques are guaranteed to work uniformly, with no special cases that need to be considered. For example, these techniques work in a Fabric where not all switches have been upgraded/configured to implement these techniques. However, only those switches that have been upgraded or configured to implement these techniques can become Principal Switches using the 'Principal' option in the CLI command, but the others switches can at least continue to be subordinate switches. In other words, these techniques are backwards compatible with existing FC Fabrics and equipment. Still another advantage is that most Principal Switch selections last only the duration of the first part of a traditional Principal Switch selection, for example, 4 seconds, instead of the default 10 seconds.

Once a switch becomes the Principal Switch, it will keep winning all future Principal Switch selections after about 4 seconds into the Principal Switch Selection phase, i.e., after the first portion of the Principal Switch Selection phase. This ensures that once selected, a Principal Switch cannot accidentally lose its role due to network events that trigger reconfigurations, such as, one more FC links going down, a VSAN being manually restarted in order to apply some configuration, or switches being removed from or added to the Fabric.

The operations depicted by FIGS. 4 and 5 may be summarized as follows. At an FC switch that is currently not serving as a Principal Switch among a plurality of FC switches in a FC Fabric, an input command is received to restart the FC Fabric. The FC switch immediately sends to neighboring FC switches, during a first portion of a Principal Switch Selection phase, an EFP frame having a non-empty domain identifier list to indicate that the FC switch is to immediately serve as the Principal Switch in the FC Fabric and supersede another FC switch that is currently serving as the Principal Switch. The FC switch that is currently serving as the Principal Switch may arbitrarily be referred to as a first FC switch and the FC switch that receives the input command to restart the FC Fabric may be arbitrarily referred to as a second FC switch. The EFP frame sent during the first portion occurs before a second portion of the Principal Switch Selection when the other FC switch that is currently serving as the Principal Switch is to send an EFP frame with a non-empty domain identifier list. This ensures that the EPF frame with a non-empty domain id list from the FC switch to become the Principal Switch is received by all switches in the Fabric FC switch before the EFP frame (with a non-empty domain id list) is received from the FC switch concurrently serving as the Principal Switch.

Figure 6:
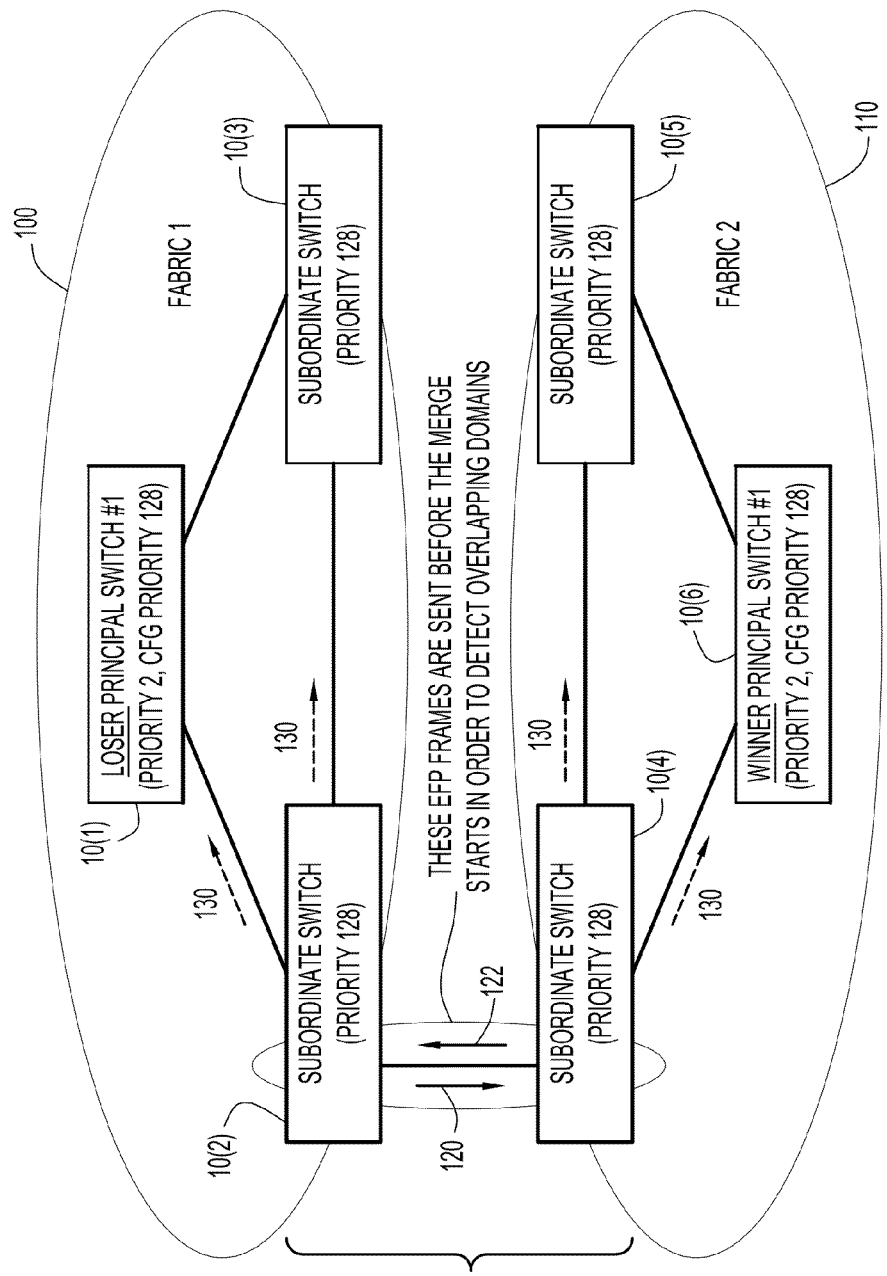
FIG. 6 is a diagram illustrating two Fibre Channel Fabrics to be merged and in which one of the Principal Switches of the two Fabrics is selected to be the Principal Switch of the merged Fabric.

Reference is now made to FIG. 6 for a description of application of the persistent Principal Switch selection techniques to the merging of two FC Fabrics. The persistent Principal Switch selection techniques described above provide that a Principal Switch eventually sends EFP frames with a non-empty domain id list such that it does not give up its role to allow another Fabric to merge with its Fabric. FIG. 6 shows an example where a first Fabric 100 comprises switches 10(1), 10(2) and 10(3) and a second Fabric 110 comprises switches 10(4), 10(5) and 10(6). It should be understood that FIG. 6 is a highly simplified diagram and there may be many more switches (as well as associated storage arrays and host servers) in an actual deployment.

In this scenario, switches 10(2) and 10(4) are two switches involved in the merge that exchange EFP frames. At the start of any merge attempt, switches 10(2) and 10(4) will have to exchange EFP frames in order to detect overlapping domains. Thus, switch 10(2) sends an EFP frame 120 before the merge to switch 10(4) and switch 10(4) sends an EFP frame 122 before the merge to switch 10(2) so that the switches 10(2) and 10(4) can examine the domain id's of the respective Fabrics 100 and 110 to detect whether they overlap (i.e., are the same). The EFP frames exchanged between switches 10(2) and 10(4) prior to the merge contain the WWN and priority of the respective Fabrics. As a result of receiving these EFP frames pre-merge, switch 10(2) will obtain from the header of the EFP frame 122 the WWN and priority information of the Principal Switch in Fabric 110 (i.e., switch 10(1)), and switch 10(4) will obtain from the header of the EFP frame 120 the WWN and priority information of the Principal Switch in Fabric 100 (i.e., switch 10(6)). After this pre-merge exchange of EFP frames, each of the switches 10(2) and 10(4) can determine which of the Principal Switches 10(1) and 10(6) has the best priority (based on WWN byte value in this example) and should be the Principal Switch of the merger of the two Fabrics. Specifically, switches 10(2) and 10(4) each will know that the priority of switch 10(1), the Principal Switch of Fabric 100, is better than the priority of switch 10(6), the Principal Switch of Fabric 110. Then, when the Principal Switch Selection phase starts for the merged Fabric (merger of Fabrics 100 and 110), the switches 10(2) and 10(4) each send EFP frames shown at 130 with a domain id list proposing switch 10(6) as the Principal Switch for merged Fabric. In one special case, a single switch joining a larger Fabric is made to always accept to become a subordinate switch.

Figure 7:
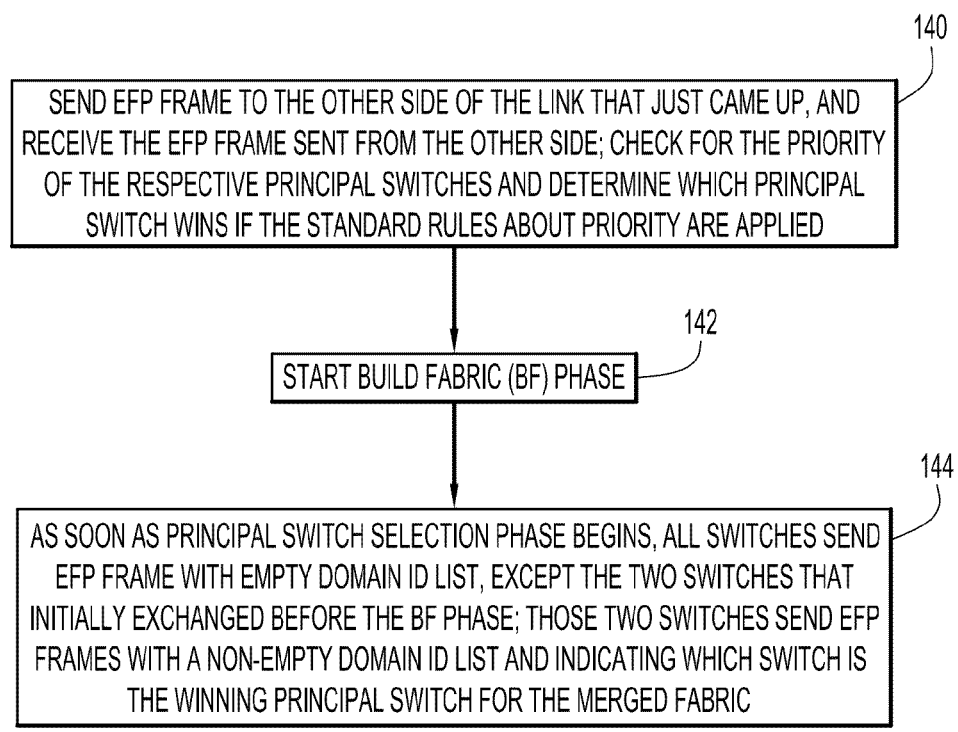
FIG. 7 is a flow chart depicting the operations to select a Principal Switch for a merged Fabric scenario such as that depicted in FIG. 6.

Turning to FIG. 7, a flow chart is shown illustrating operations performed in switches to handle the scenario depicted in FIG. 6. These operations are performed in the switches that are in communication with the switches of another Fabric in a multi-fabric merger. At 140, the switch sends an EFP frame to the other side of the link (in the other Fabric) and receives the EFP frame sent from the other side (in the other Fabric). These are the EFP frames that are exchanged prior to a merger of the two Fabrics. The switches evaluate the header of the received EFP frame to determine the priority of the Principal Switch in the other Fabric and thereby determine which Principal Switch of the two Fabrics has the overall best priority and should win if the standard rules of priority were applied. At 142, a Build Fabric (BF) phase is started to merge the two Fabrics into one Fabric. At 144, the switches that exchanged EFP frames prior to the merge now send (to their neighboring switches) EFP frames with a non-empty domain id list and indicating/identifying the winning Principal Switch for the merged Fabric. All other switches send EFP frames with an empty domain id list. The Principal Switch identified in the EFP frames sent by the switches involved in the pre-merge EFP frame exchange immediately becomes the Principal Switch for the merged fabric. That Principal Switch can send EFP frames to its neighbors with a non-empty domain id list to indicate to all other switches in the merged Fabric that it is the Principal Switch for the merged Fabric.

The techniques depicted by FIGS. 6 and 7 may be summarized as follows. A first FC switch in a first FC Fabric that is to be merged with a second FC Fabric sends to a second FC switch in the second FC Fabric an EFP frame that includes information about an FC switch that is currently serving as a Principal Switch in the first FC fabric. The first FC switch receives from the second FC switch an EFP frame that includes information about a FC switch that is currently serving as a Principal Switch in the second FC Fabric. The first FC switch determines which of the FC switches that are serving as the Principal Switches in the first and second FC Fabrics, respectively, has a better priority, and is to serve as the Principal Switch for a merged FC Fabric of the first and second FC Fabrics. Upon initiation of a Principal Switch Selection phase for the merged FC Fabric, the first FC switch sends to neighboring FC switches an EFP frame with a non-empty domain identifier list and including information indicating the FC switch that is to serve as the Principal Switch for the merged FC Fabric.

There are several advantages to the techniques presented herein. First, it is easier, more consistent and intuitive to choose which switch becomes the new Principal Switch. Only one CLI command, instead of three or four CLI commands, is needed to change the Principal Switch. A network administrator can simply go to a chosen switch and initiate a CLI command to restart the Fabric and make it the Principal Switch. Once a switch is a Principal Switch, it will never accidentally lose its role as a Principal Switch due to unrelated network events.

Furthermore, some FC switches use "smaller" (lower byte value) WWNs, and thus it could be more difficult to make such switches subordinate, particularly when those switches are assigned priority 1. However, the techniques described herein provide for a way to always make any FC switch become the Principal Switch, even when it is interoperating with switches with smaller WWNs.

These techniques operate in networks where not all switches have been upgraded to support this persistent Principal Switch feature, such as VSANs configured to work in an interoperability mode.

Further still, a Build Fabric phase lasts 5 seconds, and a Principal Switch Selection phase lasts 10 seconds. Thus, normally a reconfiguration of a Fabric would last a total of about 15 seconds. However, using these techniques, after 4 seconds into a Principal Switch Selection a persistent Principal Switch will start sending EFP frames with a non-empty domain id list such that the other switches will immediately move to the Domain Id Distribution phase, and request for one or more domains. This means that overall a "non-principal restart" will last approximately 9 seconds, instead of 15 seconds, making it 40% faster than convention techniques. Dividing the default 10 seconds of the Principal Switch Selection Phase in two parts: the first of 4 seconds, and the second of 6 seconds, is reasonable, but also somewhat arbitrary. These techniques are applicable to any suitable division of the duration of the Principal Switch Selection Phase, for example, each portion may be 5 seconds, or the first portion may be 3 seconds and the second portion 7 seconds.

Merging two fabrics normally takes about 15 seconds. Due to the fact that the two switches responsible to detect overlapping domains send EFP frames with a non-empty domain id list immediately at the start of a Principal Switch Selection phase according to these techniques, a merge will take only about 5 seconds, making it 3 times faster.

Changing the Principal Switch normally takes about 15 seconds. However, since the future Principal Switch sends EFP frames with a non-empty domain id list at the start of the Principal Switch Selection, changing the Principal Switch will take approximately 5 seconds, making it 3 times faster.

The above description is intended by way of example only.

What is claimed is:

1. A method comprising:
   at a first Fibre Channel switch that is currently serving as a Principal Switch among a plurality of Fibre Channel switches in a Fibre Channel Fabric, sending to neighboring Fibre Channel switches an Exchange Fabric Parameters (EFP) frame having an empty domain identifier list during a first portion a Principal Switch Selection phase, wherein during the first portion of the Principal Switch Selection phase the neighboring Fibre Channel switches also send EFP frames having an empty domain identifier list; and
   during a second portion of the Principal Switch Selection phase that is after the first portion, sending from the first Fibre Channel switch to the neighboring Fibre Channel switches an EFP frame having a non-empty domain identifier list to indicate to the neighboring Fibre Channel switches that the first Fibre Channel switch is to remain serving as the Principal Switch in the Fibre Channel Fabric, wherein during the second portion of the Principal Switch Selection phase the neighboring Fibre Channel switches continue to send EFP frames having an empty domain identifier list.

2. The method of claim 1, wherein during the first portion of the principal selection phase, sending from all Fibre Channel switches in the Fibre Channel Fabric an EFP frame having an empty domain identifier list.

3. The method of claim 2, and further comprising all Fibre Channel switches, other than the first Fibre Channel switch, sending an EFP frame having an empty domain identifier list during the second portion of the Principal Switch Selection phase.

4. The method of claim 1, and further comprising receiving a command at a second Fibre Channel switch to restart the Fibre Channel Fabric, and during the first portion of the principal selection phase, sending to neighboring Fibre Channel switches an EFP frame having a non-empty domain identifier list to indicate that the second Fibre Channel switch is to immediately serve as the Principal Switch in the Fibre Channel Fabric and supersede the first Fibre Channel switch as the Principal Switch.

5. The method of claim 4, wherein receiving a command comprises receiving a restart domain that includes one or more options that indicate a change in the Principal Switch after restart of the Fibre Channel Fabric.

6. The method of claim 1, wherein the second portion is longer in duration than the first portion.

7. A method comprising:
   at a Fibre Channel switch that is currently not serving as a Principal Switch among a plurality of Fibre Channel switches in a Fibre Channel Fabric, receiving an input command to restart the Fibre Channel Fabric; and
   sending from the Fibre Channel switch during a first portion of a Principal Switch Selection phase to neighboring Fibre Channel switches an Exchange Fabric Parameters (EFP) frame having a non-empty domain identifier list to indicate that the Fibre Channel switch is to immediately serve as the Principal Switch in the Fibre Channel Fabric and supersede another Fibre Channel switch that is currently serving as the Principal Switch, wherein during the first portion of the Principal Switch Selection phase, the switch that is currently serving as the Principal Switch and the neighboring Fibre Channel switches send EFP frames having an empty domain identifier list.

8. The method of claim 7, wherein sending comprises sending the EFP frame during the first portion that comes before a second portion of the Principal Switch Selection phase during which the Fibre Channel switch that is currently serving as the Principal Switch is to send an EFP frame with a non-empty domain identifier list.

9. A method comprising:
- at a first Fibre Channel switch in a first Fibre Channel Fabric that is to be merged with a second Fibre Channel Fabric, sending to a second Fibre Channel switch in the second Fibre Channel Fabric an Exchange Fabric Parameters (EFP) frame that includes information about a Fibre Channel switch that is currently serving as a Principal Switch in the first Fibre Channel fabric;
- receiving at the first Fibre Channel switch from the second Fibre Channel switch an EFP frame that includes information about a Fibre Channel switch that is currently serving as a Principal Switch in the second Fibre Channel Fabric;
- at the first Fibre Channel switch, determining which of the Fibre Channel switches that are serving as the Principal Switches in the first and second Fibre Channel Fabrics, respectively, has a better priority, and is to serve as the Principal Switch for a merged Fibre Channel Fabric of the first and second Fibre Channel Fabrics;
- upon initiation of a Principal Switch Selection phase for the merged Fibre Channel Fabric, sending to neighboring Fibre Channel switches from the first Fibre Channel switch an EFP frame with a non-empty domain identifier list and including information indicating the Fibre Channel switch that is to serve as the Principal Switch for the merged Fibre Channel Fabric; and
- while sending to neighboring Fibre Channel switches an EFP frame with a non-empty domain identifier list, receiving from the neighboring Fibre Channel switches other than the second Fibre Channel switch EFP frames with an empty domain identifier list.

10. The method of claim 9, and further comprising:
- at the second Fibre Channel switch, determining which of the Fibre Channel switches which are serving as the Principal Switches in the first and second Fibre Channel Fabrics, respectively, has a higher priority, and is to serve as the Principal Switch for a merged Fibre Channel Fabric of the first and second Fibre Channel Fabrics;
- upon initiation of a Principal Switch Selection phase for the merged Fibre Channel Fabric, sending to neighboring Fibre Channel switches from the second Fibre Channel switch an EFP frame with a non-empty domain identifier list and including information indicating the Fibre Channel switch that is to serve as the Principal Switch for the merged Fibre Channel Fabric; and
- while sending to neighboring Fibre Channel switches an EFP frame with a non-empty domain identifier list, receiving from the neighboring Fibre Channel switches other than the first Fibre Channel switch EFP frames with an empty domain identifier list.

11. The method of claim 9, wherein determining comprises evaluating runtime priority and byte values of World Wide Names of the Fibre Channel switches serving as Principal Switches in the first and second Fibre Channel Fabrics, respectively.

12. A method comprising:
- at a Fibre Channel switch among a plurality of Fibre Channel switches in a Fibre Channel Fabric, receiving during a first portion of a Principal Switch Selection phase from a plurality of neighboring Fibre Channel switches an Exchange Fabric Parameters (EFP) frame having an empty domain identifier list;
- during a second portion of the Principal Switch Selection phase that is after the first portion, receiving from a first of the plurality of neighboring Fibre Channel switches an EFP frame having a non-empty domain identifier list, while receiving from the remaining plurality of neighboring Fibre Channel switches an EFP frame having an empty domain identifier list; and
- storing in the Fibre Channel switch an indication that the first Fibre Channel is to serve as a Principal Switch in the Fibre Channel Fabric.

13. The method of claim 12, wherein during the first portion of the principal selection phase, receiving from all Fibre Channel switches in the Fibre Channel Fabric an EFP frame having an empty domain identifier list.

14. The method of claim 12, and further comprising:
- during the first portion of the principal selection phase, receiving from a second Fibre Channel switch an EFP frame having a non-empty domain identifier list; and
- storing information to indicate that the second Fibre Channel switch is to immediately serve as the Principal Switch in the Fibre Channel Fabric and supersede the first Fibre Channel switch as the Principal Switch.

15. One or more non-transitory computer readable storage media encoded with software comprising computer executable instructions and when the software is executed operable to:
- in a Fibre Channel switch that is currently serving as a Principal Switch among a plurality of Fibre Channel switches in a Fibre Channel Fabric, generate an Exchange Fabric Parameters (EFP) frame having an empty domain identifier list to be sent to neighboring Fibre Channel switches during a first portion a Principal Switch Selection phase, wherein during the first portion of the Principal Switch Selection phase the neighboring Fibre Channel switches also send EFP frames having an empty domain identifier list; and
- generate an EFP frame having a non-empty domain identifier list to be sent from the Fibre Channel switch to neighboring Fibre Channel switches during a second portion of the Principal Switch Selection phase that is after the first portion, to indicate to the neighboring Fibre Channel switches that the Fibre Channel switch is to remain serving as the Principal Switch in the Fibre Channel Fabric, wherein during the second portion of the Principal Switch Selection phase the neighboring Fibre Channel switches continue to send EFP frames having an empty domain identifier list.

16. One or more non-transitory computer readable storage media encoded with software comprising computer executable instructions and when the software is executed operable to:
- in a Fibre Channel switch that is currently not serving as a Principal Switch among a plurality of Fibre Channel switches in a Fibre Channel Fabric, receive an input command to restart the Fibre Channel Fabric; and
- generate an Exchange Fabric Parameters (EFP) frame having a non-empty domain identifier list to be sent from the Fibre Channel switch during a first portion of a Principal Switch Selection phase to neighboring Fibre Channel switches to indicate that the Fibre Channel switch is to immediately serve as the Principal Switch in the Fibre Channel Fabric and supersede another Fibre Channel switch that is currently serving as the Principal Switch, wherein during the first portion of the Principal Switch Selection phase, the switch that is currently serving as the Principal Switch and the neighboring Fibre Channel switches send EFP frames having an empty domain identifier list.

17. One or more non-transitory computer readable storage media encoded with software comprising computer executable instructions and when the software is executed operable to:
- in a first Fibre Channel switch in a first Fibre Channel Fabric that is to be merged with a second Fibre Channel Fabric, generate an Exchange Fabric Parameters (EFP) frame that includes information about a Fibre Channel switch that is currently serving as a Principal Switch in the first Fibre Channel fabric, the EFP frame to be sent to a second Fibre Channel switch in the second Fibre Channel Fabric;
- receive at the first Fibre Channel switch from the second Fibre Channel switch an EFP frame that includes information about a Fibre Channel switch that is currently serving as a Principal Switch in the second Fibre Channel Fabric;
- determine which of the Fibre Channel switches that are serving as the Principal Switches in the first and second Fibre Channel Fabrics, respectively, has a higher priority, and is to serve as the Principal Switch for a merged Fibre Channel Fabric of the first and second Fibre Channel Fabrics;
- upon initiation of a Principal Switch Selection phase for the merged Fibre Channel Fabric, generate an EFP frame with a non-empty domain identifier list and including information indicating the Fibre Channel switch that is to serve as the Principal Switch for the merged Fibre Channel Fabric, to be sent to neighboring Fibre Channel switches from the first Fibre Channel switch; and
- while an EFP frame with a non-empty domain identifier list is sent to the neighboring Fibre Channel switches, receiving from the neighboring Fibre Channel switches other than the second Fibre Channel switch EFP frames with an empty domain identifier list.

18. The non-transitory computer readable storage media of claim 17, wherein the instructions operable to determine comprise instructions operable to evaluate runtime priority and byte values of World Wide Names of the Fibre Channel switches serving as Principal Switches in the first and second Fibre Channel Fabrics, respectively.

19. An apparatus comprising:
Fibre Channel switch hardware configured to perform switch operations in a Fibre Channel Fabric;
one or more network interfaces configured to enable communications for a Fibre Channel switch over the Fibre Channel Fabric; and
a processor coupled to the Fibre Channel switch hardware and the one or more network interfaces, the processor configured to:
- generate an Exchange Fabric Parameters (EFP) frame having an empty domain identifier list to be sent from a Fibre Channel switch to neighboring Fibre Channel switches during a first portion a Principal Switch Selection phase, wherein during the first portion of the Principal Switch Selection phase the neighboring Fibre Channel switches also send EFP frames having an empty domain identifier list; and
- generate an EFP frame having a non-empty domain identifier list to be sent from the Fibre Channel switch to neighboring Fibre Channel switches during a second portion of the Principal Switch Selection phase that is after the first portion, to indicate to the neighboring Fibre Channel switches that the Fibre Channel switch is to remain serving as the Principal Switch in the Fibre Channel Fabric, wherein during the second portion of the Principal Switch Selection phase the neighboring Fibre Channel switches continue to send EFP frames having an empty domain identifier list.

20. An apparatus comprising:
Fibre Channel switch hardware configured to perform switch operations in a Fibre Channel Fabric;
one or more network interfaces configured to enable communications for a Fibre Channel switch over the Fibre Channel Fabric; and
a processor coupled to the Fibre Channel switch hardware and the one or more network interfaces, the processor configured to:
- receive, at a Fibre Channel switch that is currently not serving as a Principal Switch among a plurality of Fibre Channel switches in the Fibre Channel Fabric, an input command to restart the Fibre Channel Fabric; and
- generate an Exchange Fabric Parameters (EFP) frame having a non-empty domain identifier list to be sent from the Fibre Channel switch to neighboring Fibre Channel switches during a first portion of a Principal Switch Selection phase to indicate that the Fibre Channel switch is to immediately serve as the Principal Switch in the Fibre Channel Fabric and supersede another Fibre Channel switch that is currently serving as the Principal Switch, wherein during the first portion of the Principal Switch Selection phase, the switch that is currently serving as the Principal Switch and the neighboring Fibre Channel switches send EFP frames having an empty domain identifier list.

21. The apparatus of claim 20, wherein the processor is further configured to send the EFP frame during the first portion that comes before a second portion of the Principal Switch Selection phase during which the Fibre Channel switch that is currently serving as the Principal Switch is to send an EFP frame with a non-empty domain identifier list.

* * * * *